(12) United States Patent
Okuma

(10) Patent No.: US 7,477,327 B2
(45) Date of Patent: Jan. 13, 2009

(54) ANALOG/DIGITAL-COMPATIBLE FRONT-END MODULE

(75) Inventor: Hideyuki Okuma, Hirakata (JP)

(73) Assignees: Sanyo Electric Co., Ltd., Miroguchi-shi (JP); Sanyo Tuner Industries Co., Ltd., Osaka (JP)

( * ) Notice: Subject to any disclaimer, the term of this patent is extended or adjusted under 35 U.S.C. 154(b) by 566 days.

(21) Appl. No.: 10/553,739

(22) PCT Filed: Oct. 27, 2004

(86) PCT No.: PCT/JP2004/016294
§ 371 (c)(1),
(2), (4) Date: Oct. 20, 2005

(87) PCT Pub. No.: WO2005/043895
PCT Pub. Date: May 12, 2005

(65) Prior Publication Data
US 2006/0209216 A1    Sep. 21, 2006

(30) Foreign Application Priority Data
Oct. 31, 2003    (JP)    ............................. 2003-372032

(51) Int. Cl.
*H04N 5/50* (2006.01)
(52) U.S. Cl. .................... 348/731; 348/725; 348/678; 348/555
(58) Field of Classification Search .......... 348/731–733, 348/735–736, 553–555, 558, 678–679, 725–726, 348/721, 705–706; 455/207, 245.2; *H04N 5/50*
See application file for complete search history.

(56) References Cited

U.S. PATENT DOCUMENTS

| 5,956,098 | A | 9/1999 | Mizukami et al. |
| 6,353,463 | B1 | 3/2002 | Seo |
| 6,622,308 | B1 * | 9/2003 | Raiser .................. 725/151 |

(Continued)

FOREIGN PATENT DOCUMENTS

JP    7-30824    1/1995

(Continued)

OTHER PUBLICATIONS

Supplemental European Search Report dated Oct. 27, 2006 issued in European Application No. EP 04 79 3327.

*Primary Examiner*—Trang U Tran
(74) *Attorney, Agent, or Firm*—Westerman, Hattori, Daniels & Adrian, LLP.

(57) ABSTRACT

An analog/digital-compatible front-end module comprises a high frequency amplifier 9 for amplifying a high frequency signal received by an antenna 1; a frequency converter circuit 11 for frequency-converting an output signal from the high frequency amplifier 9 to output an intermediate frequency signal; an analog demodulator 5; a digital demodulator 6; an analog/digital switch 4 for selectively feeding an output signal from the frequency converter circuit 11 to the analog demodulator 5 or to the digital demodulator 6; and an AGC signal switch 7 for controlling gain of the high frequency amplifier 9 in accordance with a gain control signal obtained from the analog demodulator 5 during an analog broadcast reception, while controlling gain of the high frequency amplifier 9 in accordance with a gain control signal produced from the output signal from the frequency converter circuit 11 during a digital broadcast reception.

7 Claims, 3 Drawing Sheets

U.S. PATENT DOCUMENTS

| | | | |
|---|---|---|---|
| 6,678,011 B2 * | 1/2004 | Yanagi et al. | 348/725 |
| 7,202,910 B1 * | 4/2007 | Grubbs et al. | 348/555 |
| 7,239,358 B1 * | 7/2007 | Mayer | 348/731 |
| 2003/0128303 A1 | 7/2003 | Masuda | |

FOREIGN PATENT DOCUMENTS

| | | |
|---|---|---|
| JP | 8-181556 | 7/1996 |
| JP | 11-98426 | 4/1999 |
| JP | 11-261913 | 9/1999 |
| JP | 2000-59707 | 2/2000 |
| JP | 2003-204274 | 7/2003 |
| WO | WO 00/64151 A1 | 10/2000 |

* cited by examiner

ANALOG/DIGITAL-COMPATIBLE FRONT-END MODULE

TECHNICAL FIELD

The present invention relates to an analog/digital-compatible front-end module capable of receiving analog television broadcast and digital television broadcast.

BACKGROUND ART

Digital television broadcast has newly started in addition to current analog television broadcast. The analog television broadcast and digital television broadcast are supposed to be transmitted simultaneously for a certain period of time. For this period, the digital television broadcast is transmitted with lower transmission power than that of the analog television broadcast, or is transmitted using a channel between analog television broadcast channels, in order not to affect the analog television broadcast. Therefore, digital broadcast receivers need sensitivity of reception in a weak electric field and properties of being able to endure interferences from neighboring channels.

Also in view of a cost and size of the product, a demand has become higher for an analog/digital-compatible front-end module capable of receiving both analog television broadcast and digital television broadcast having an analog demodulator and a digital demodulator provided in one receiving circuit in place of an analog receiving tuner and a digital receiving tuner provided separately.

Accordingly, various analog/digital-compatible front-end modules have been proposed (see Patent Documents 1-4).

Patent Document 1. JP 11-98426 A
Patent Document 2. JP 11-261913 A
Patent Document 3. JP 2000-59707 A
Patent Document 4. JP 2003-204274 A For example, an analog/digital-compatible front-end module shown in FIG. 2 includes a tuner unit 17 for tuning-processing a high frequency signal received by an antenna 1, and a demodulation unit 21 for processing an intermediate frequency signal output from the tuner unit 17. Analog/digital switches 4 and 19 included in the demodulation unit 21 select an analog demodulator 5 during an analog broadcast reception, while the analog/digital switches 4 and 19 select a digital demodulator 6 during a digital broadcast reception.

The high frequency signal received by the antenna 1 passes through a first bandpass filter 8, a high frequency amplifier 9, and a second bandpass filter 10, is fed to a frequency converter circuit 18, and is frequency-converted. The intermediate frequency signal output from the tuner unit 17 passes through a surface acoustic wave filter 3 and the analog/digital switch 4, is fed to the analog demodulator 5 or to the digital demodulator 6, and is demodulating-processed.

During the analog broadcast reception, an output signal from the analog demodulator 5 is fed to the high frequency amplifier 9 of the tuner unit 17 as a high frequency gain control (RF AGC) signal to control gain of the high frequency amplifier 9. During the digital broadcast reception, an output signal from the digital demodulator 6 is fed to the high frequency amplifier 9 of the tuner unit 17 as a high frequency gain control (RF AGC) signal to control gain of the high frequency amplifier 9.

According to the analog/digital-compatible front-end module shown in FIG. 2, gain control (AGC) of the high frequency amplifier 9 is performed based on the intermediate frequency signal that has passed through the surface acoustic wave filter 3 with a narrow band, so that AGC control accurate to a desired wave is realized.

An analog/digital-compatible front-end module shown in FIG. 3 includes a tuner unit 2 for tuning-processing a high frequency signal received by an antenna 1, and a demodulation unit 20 for processing an intermediate frequency signal output from the tuner unit 2. An analog/digital switch 4 included in the demodulation unit 20 selects an analog demodulator 5 during an analog broadcast reception, while the analog/digital switch 4 selects a digital demodulator 6 during a digital broadcast reception.

The high frequency signal received by the antenna 1 passes through a first bandpass filter 8, a high frequency amplifier 9, and a second bandpass filter 10, is fed to a frequency converter circuit 11, and is frequency-converted. The intermediate frequency signal output from the tuner unit 2 passes through a surface acoustic wave filter 3 and the analog/digital switch 4, is fed to the analog demodulator 5 or to the digital demodulator 6, and is demodulating-processed.

During the analog broadcast reception or digital broadcast reception, an output signal (a high frequency gain control (RF AGC) signal) from an AGC signal detector circuit 15 connected to an output end of an intermediate frequency amplifier 14 included in the frequency converter circuit 11 is fed to the high frequency amplifier 9 to control gain of the high frequency amplifier 9.

According to the analog/digital-compatible front-end module shown in FIG. 3, gain control (AGC) of the high frequency amplifier 9 is performed based on the intermediate frequency signal that has passed through the bandpass filter 10 with a wide band, and has been frequency-converted, so that if a higher-level interference wave than a desired wave exists in a neighboring channel, the interference wave is detected and control for lowering the gain of the high frequency amplifier 9 is performed. Consequently, a level of a signal input to a mixer 13 or the intermediate frequency amplifier 14 included in the frequency converter circuit 11 becomes lower, and therefore is unlikely to exceed a saturation level for the mixer 13 or intermediate frequency amplifier 14. This leads to good distortion properties.

However, in the analog/digital-compatible front-end module shown in FIG. 2, if a higher-level interference wave than a desired wave exists in a neighboring channel, because the AGC is performed on a basis for a level of the desired wave, a level of the interference wave is likely to exceed a saturation level for a mixer 13 or an intermediate frequency amplifier 14. This causes a problem that distortion properties of the mixer 13 or intermediate frequency amplifier 14 become worse.

On the other hand, in the analog/digital-compatible front-end module shown in FIG. 3, if a higher-level interference wave than a desired wave exists in a neighboring channel, because the interference wave is detected and the AGC is performed, a signal level of the desired wave becomes lower, which causes a problem that S/N properties become worse.

Accordingly, an object of the present invention is to provide an analog/digital-compatible front-end module excellent in both S/N ratio, a decrease of which has been a problem in analog broadcast, and distortion properties, which have been a problem since digital broadcast started, whether broadcast to be received is analog broadcast or digital broadcast.

DISCLOSURE OF THE INVENTION

An analog/digital-compatible front-end module of the present invention comprises a high frequency amplifier 9 for amplifying a high frequency signal received by an antenna 1; a frequency converter circuit for frequency-converting an output signal from the high frequency amplifier 9 to output an intermediate frequency signal; an analog demodulator 5 for receiving analog television broadcast; a digital demodulator 6 for receiving digital television broadcast; analog/digital switching means for selectively feeding an output signal from the frequency converter circuit to the analog demodulator 5 or to the digital demodulator 6; and gain control switching means for controlling gain of the high frequency amplifier 9 in accordance with a gain control signal obtained from the analog demodulator 5 during an analog broadcast reception, while controlling gain of the high frequency amplifier 9 in accordance with a gain control signal produced from the output signal from the frequency converter circuit during a digital broadcast reception.

Specifically, a wideband filter is interposed between the high frequency amplifier 9 and the frequency converter circuit, and a narrowband filter is interposed between the frequency converter circuit and the analog/digital switching means.

Further, the frequency converter circuit comprises an intermediate frequency amplifier 14 for amplifying the intermediate frequency signal frequency-converted, and during the digital broadcast reception the gain control signal is produced from an output signal from the intermediate frequency amplifier 14, and is fed for gain control of the high frequency amplifier 9 by the gain control switching means.

Furthermore, the gain control switching means comprises a signal switch 7 for selecting the gain control signal produced from the output signal from the frequency converter circuit or the gain control signal obtained from the analog demodulator 5 to feed the selected signal to the high frequency amplifier 9.

In the above-described analog/digital-compatible front-end module, during the analog broadcast reception, the analog/digital switching means selects the analog demodulator 5 to feed the output signal from the frequency converter circuit to the analog demodulator 5. The gain control switching means also selects the analog demodulator 5 to control the gain of the high frequency amplifier 9 in accordance with the gain control signal obtained from the analog demodulator 5.

Consequently, gain control (AGC) of the high frequency amplifier 9 is performed based on a level of a desired wave (the intermediate frequency signal), so that the AGC accurate to the desired wave is realized.

If a higher-level interference wave than the desired wave exists in a neighboring channel, because the AGC is performed on a basis for the level of the desired wave, a level of the interference wave can become higher and make distortion properties in the frequency converter circuit worse. However, during the analog broadcast reception, a digital broadcasting signal, which can be interference, has a lower level than an analog broadcasting signal, to prevent the distortion properties from worsening.

On the other hand, during the digital broadcast reception, the analog/digital switching means selects the digital demodulator 6 to feed the output signal from the frequency converter circuit to the digital demodulator 6. Also, the gain control switching means selects the frequency converter circuit to control the gain of the high frequency amplifier 9 in accordance with the gain control signal produced from the output signal from the frequency converter circuit. Consequently, gain control (AGC) of the high frequency amplifier 9 is performed based on the intermediate frequency signal including an interference wave that exists in a neighboring channel, so that if a higher-level interference wave than a desired wave exists in the neighboring channel, the interference wave is detected and control for lowering the gain of the high frequency amplifier 9 is performed. Accordingly, a level of a signal input to the frequency converter circuit becomes lower, which leads to good distortion properties in the frequency converter circuit.

If a higher-level interference wave than a desired wave exists in a neighboring channel, because the AGC is performed on a basis for a level of the interference wave, a signal level of the desired wave can become lower and make S/N properties worse. However, a digital broadcasting signal is scarcely affected by noise, and therefore slightly worse S/N properties do not lower image quality.

BEST MODE FOR CARRYING OUT THE INVENTION

A description of an embodiment of an analog/digital-compatible front-end module of the present invention will be given below with reference to the drawings.

Figure 1:
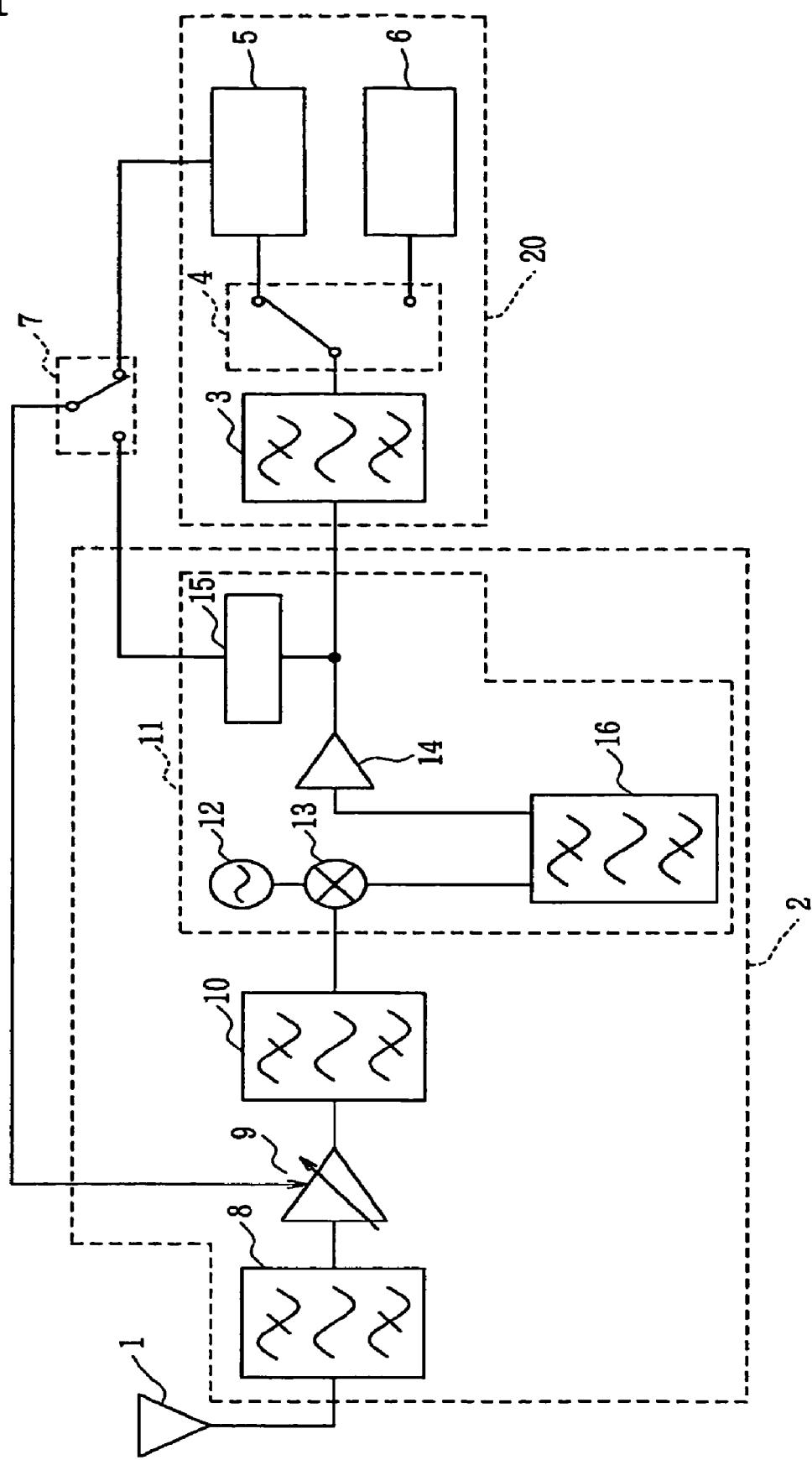
FIG. 1 is a block diagram showing a construction of an analog/digital-compatible front-end module of the present invention.
Figure 2:
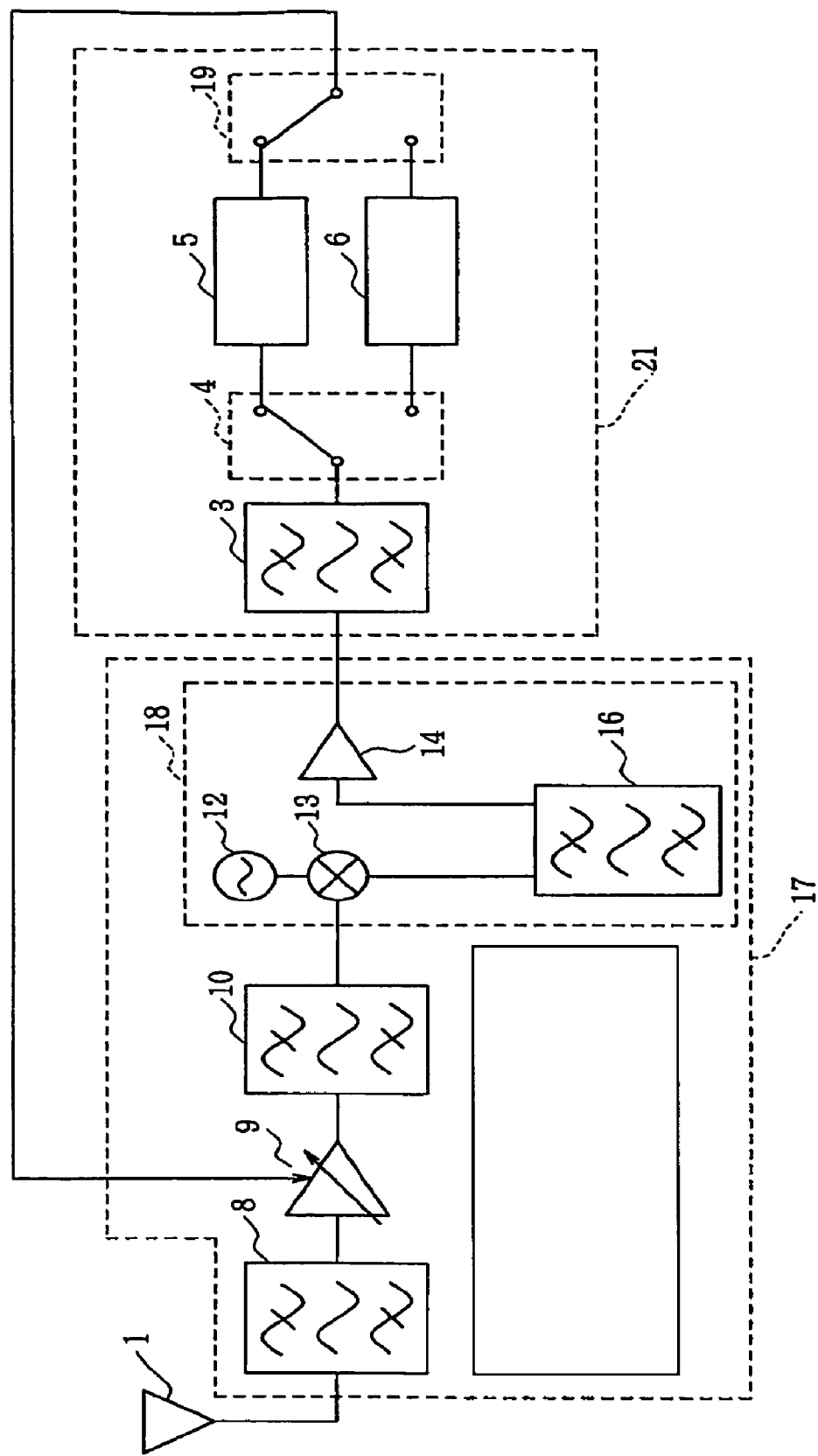
FIG. 2 is a block diagram showing a construction of a conventional analog/digital-compatible front-end module.
Figure 3:
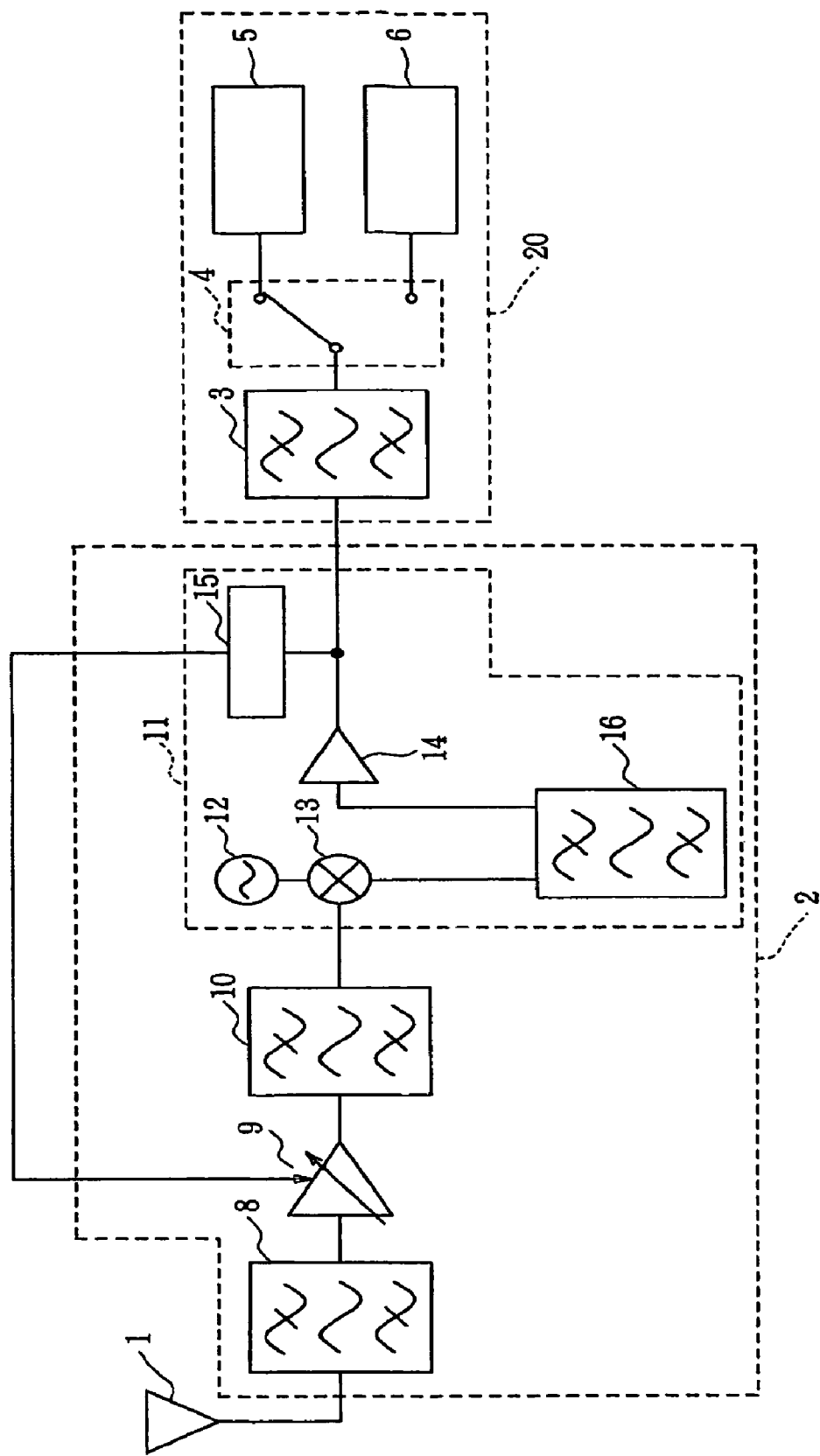
FIG. 3 is a block diagram showing a construction of another conventional analog/digital-compatible front-end module.

As shown in FIG. 1, an analog/digital-compatible front-end module of the present invention includes a tuner unit 2 for processing a high frequency signal received by an antenna 1, and a demodulation unit 20 for processing an intermediate frequency signal output from the tuner unit 2. An analog/digital switch 4 included in the demodulation unit 20 selects an analog demodulator 5 during an analog broadcast reception, while the analog/digital switch 4 selects a digital demodulator 6 during a digital broadcast reception.

The high frequency signal received by the antenna 1 passes through a first bandpass filter 8, which is an RF filter, a high frequency amplifier 9, and a second bandpass filter 10, which is an RF filter, and is fed to a frequency converter circuit 11. The frequency converter circuit 11 includes a local oscillator 12 and a mixer 13. An intermediate frequency bandpass filter 16, which is an IF filter, is interposed between the mixer 13 and an intermediate frequency amplifier 14.

An AGC signal detector circuit 15 is connected to an output end of the intermediate frequency amplifier 14 of the frequency converter circuit 11.

The intermediate frequency signal output from the tuner unit 2 passes through a surface acoustic wave filter 3 and the analog/digital switch 4, is fed to the analog demodulator 5 or to the digital demodulator 6, and is demodulating-processed. Here, the surface acoustic wave filter 3 has a narrower band than that of the second bandpass filter 10 or the intermediate frequency bandpass filter 16 included in the tuner unit 2, to select and separate only a desired wave.

An output end of the AGC signal detector circuit 15 and an output end of the analog demodulator 5 are connected to two input terminals, respectively, of an AGC signal switch 7. A signal selected by the switch 7 is fed to the high frequency amplifier 9 as a high frequency gain control (RF AGC) signal.

During the analog broadcast reception, the analog/digital switch 4 selects the analog demodulator 5 to feed an output signal from the surface acoustic wave filter 3 to the analog demodulator 5. The AGC signal switch 7 also selects the analog demodulator 5 to control gain of the high frequency amplifier 9 in accordance with an AGC signal obtained from the analog demodulator 5.

Consequently, gain control (AGC) of the high frequency amplifier 9 is performed based on a level of the desired wave, so that the AGC accurate to the desired wave is realized. Furthermore, the level of the desired wave is maintained to an optimum value, so that high S/N properties are obtained.

If a higher-level interference wave than the desired wave exists in a neighboring channel, because the AGC is performed on a basis for a signal level of the desired wave and the signal level of the desired wave is clipped to the optimum value, a level of the interference wave can become higher and make distortion properties in the mixer 13 or intermediate frequency amplifier 14 worse. However, during the analog broadcast reception, a digital broadcasting signal, which can be interference, has a lower level than an analog broadcasting signal, to prevent the distortion properties in the mixer 13 or intermediate frequency amplifier 14 from worsening.

On the other hand, during the digital broadcast reception, the analog/digital switch 4 selects the digital demodulator 6 to feed the output signal from the surface acoustic wave filter 3 to the digital demodulator 6. Also, the AGC signal switch 7 selects the frequency converter circuit 11 to control the gain of the high frequency amplifier 9 in accordance with the output signal from the AGC signal detector circuit 15.

Consequently, gain control (AGC) of the high frequency amplifier 9 is performed based on the intermediate frequency signal including an interference wave that exists in a neighboring channel, so that if a higher-level interference wave than a desired wave exists in the neighboring channel, the interference wave is detected and control for lowering the gain of the high frequency amplifier 9 is performed. Accordingly, a level of a signal input to the frequency converter circuit 11 becomes lower, which leads to good distortion properties of the mixer 13 or intermediate frequency amplifier 14.

If a higher-level interference wave than a desired wave exists in a neighboring channel, because the AGC is performed on a basis for a level of the interference wave and the level of the interference wave is clipped to an optimum value, a signal level of the desired wave can become relatively lower and make S/N properties worse. However, a digital broadcasting signal is scarcely affected by noise, and therefore slightly worse S/N properties do not lower image quality.

As described above, according to the analog/digital-compatible front-end module of the present invention, a most suitable AGC wave detection method is selected depending on whether broadcast to be received is analog broadcast or digital broadcast, so that good distortion properties and S/N properties can be obtained in both analog broadcast and digital broadcast.

INDUSTRIAL APPLICABILITY

According to an analog/digital-compatible front-end module of the present invention, a most suitable AGC wave detection method is selected depending on whether broadcast to be received is analog broadcast or digital broadcast, so that good distortion properties and S/N properties can be obtained in both analog broadcast and digital broadcast.

The invention claimed is:

1. An analog/digital-compatible front-end module capable of receiving analog television broadcast and digital television broadcast, the analog/digital-compatible front-end module comprising a high frequency amplifier 9 for amplifying a high frequency signal received by an antenna 1; a frequency converter circuit for frequency-converting an output signal from the high frequency amplifier 9 to output an intermediate frequency signal; an analog demodulator 5 for receiving analog television broadcast; a digital demodulator 6 for receiving digital television broadcast; analog/digital switching means for selectively feeding an output signal from the frequency converter circuit to the analog demodulator 5 or to the digital demodulator 6; a filter for selecting and separating only a desired wave, the filter being provided between the frequency converter circuit and the analog/digital switching means; and gain control switching means for controlling gain of the high frequency amplifier 9 in accordance with a gain control signal obtained from the analog demodulator 5 during an analog broadcast reception, while controlling gain of the high frequency amplifier 9 in accordance with a gain control signal produced from the output signal from the frequency converter circuit without allowing the output signal to pass through the filter during a digital broadcast reception.

2. An analog/digital-compatible front-end module according to claim 1, wherein a wideband RF filter is interposed between the high frequency amplifier 9 and the frequency converter circuit, and an IF filter with a narrower band than that of the RF filter is interposed between the frequency converter circuit and the analog/digital switching means.

3. An analog/digital-compatible front-end module according to claim 1, wherein the frequency converter circuit comprises an intermediate frequency amplifier 14 for amplifying the intermediate frequency signal frequency-converted, and during the digital broadcast reception an output signal from the intermediate frequency amplifier 14 is detected and selected by the gain control switching means, and is fed for gain control of the high frequency amplifier 9.

4. An analog/digital-compatible front-end module according to claim 1, wherein the gain control switching means comprises a signal switch 7 for selecting the gain control signal produced from the output signal from the frequency converter circuit or the gain control signal obtained from the analog demodulator 5 to feed the selected signal to the high frequency amplifier 9.

5. An analog/digital-compatible front-end module according to claim 2, wherein the frequency converter circuit comprises an intermediate frequency amplifier 14 for amplifying the intermediate frequency signal frequency-converted, and during the digital broadcast reception an output signal from the intermediate frequency amplifier 14 is detected and selected by the gain control switching means, and is fed for gain control of the high frequency amplifier 9.

6. An analog/digital-compatible front-end module according to claim 2, wherein the gain control switching means comprises a signal switch 7 for selecting the gain control signal produced from the output signal from the frequency converter circuit or the gain control signal obtained from the analog demodulator 5 to feed the selected signal to the high frequency amplifier 9.

7. An analog/digital-compatible front-end module according to claim 3, wherein the gain control switching means comprises a signal switch 7 for selecting the gain control signal produced from the output signal from the frequency converter circuit or the gain control signal obtained from the analog demodulator 5 to feed the selected signal to the high frequency amplifier 9.

* * * * *